US008913204B2

(12) United States Patent
Kim et al.

(10) Patent No.: US 8,913,204 B2
(45) Date of Patent: Dec. 16, 2014

(54) BI-STABLE CHIRAL SPLAY NEMATIC MODE LIQUID CRYSTAL DISPLAY DEVICE AND METHOD OF DRIVING THE SAME

(75) Inventors: Dong-Guk Kim, Goyang-si (KR); Wook-Sung Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 266 days.

(21) Appl. No.: 13/099,881

(22) Filed: May 3, 2011

(65) Prior Publication Data

US 2011/0267552 A1 Nov. 3, 2011

(30) Foreign Application Priority Data

May 3, 2010 (KR) ........................ 10-2010-0041328

(51) Int. Cl.
*G02F 1/133* (2006.01)
*G09G 3/20* (2006.01)
*G09G 3/36* (2006.01)

(52) U.S. Cl.
CPC ...... *G09G 3/3651* (2013.01); *G09G 2310/0262* (2013.01); *G09G 2300/0491* (2013.01); *G09G 3/2025* (2013.01); *G09G 2380/14* (2013.01)
USPC ............... 349/33; 349/84; 349/191; 349/139; 349/140; 349/141; 345/214; 345/208; 345/94; 345/107

(58) Field of Classification Search
CPC ........................................................ G02F 1/133
USPC ........ 349/33, 84, 191; 345/214, 208, 94, 107, 345/87, 212, 88
See application file for complete search history.

(56) References Cited

U.S. PATENT DOCUMENTS

| | | | | |
|---|---|---|---|---|
| 5,796,447 | A * | 8/1998 | Okumura et al. | 349/33 |
| 6,411,273 | B1 * | 6/2002 | Nakamura et al. | 345/98 |
| 7,002,537 | B1 * | 2/2006 | Ito | 345/87 |
| 7,312,774 | B1 * | 12/2007 | Yoshihara et al. | 345/87 |
| 7,859,527 | B2 * | 12/2010 | Hirota et al. | 345/208 |
| 7,864,148 | B2 * | 1/2011 | Martinot-Lagarde et al. | 345/92 |

(Continued)

FOREIGN PATENT DOCUMENTS

| | | | | |
|---|---|---|---|---|
| JP | 2005-070729 | * | 3/2005 | G02F 1/139 |
| KR | 1020050020482 | A | 3/2005 | |
| KR | 1020060039873 | A | 5/2006 | |

OTHER PUBLICATIONS

Office Action issued in corresponding Korean Patent Application No. 10-2010-0041328, mailed Nov. 30, 2013, 4 pages.

*Primary Examiner* — Edward Glick
*Assistant Examiner* — Sang V Nguyen
(74) *Attorney, Agent, or Firm* — Brinks Gilson & Lione

(57) ABSTRACT

A method of driving a bi-stable chiral splay nematic mode liquid crystal display device including first and second substrates, a liquid crystal layer between the first and second substrates, first and second reset electrodes on one of inner surfaces of the first and second substrates, a pixel electrode on the inner surface of the first substrate and a common electrode on the inner surface of the second substrate includes: applying a data voltage and a common voltage to the pixel electrode and the common electrode, respectively, such that a vertical electric field is generated and the liquid crystal layer transitions from a splay state to a π-twist state during a writing period; and floating the pixel electrode and the common electrode such that the liquid crystal layer keeps the π-twist state and displays a present image during a memory period.

10 Claims, 3 Drawing Sheets

(56) References Cited

U.S. PATENT DOCUMENTS

2001/0011982 A1* 8/2001 Leung ............................ 345/88
2006/0274011 A1* 12/2006 Igarashi et al. ................. 345/94
2010/0128025 A1* 5/2010 Yen et al. ...................... 345/214
2010/0195008 A1* 8/2010 Hegmann et al. ............... 349/33

* cited by examiner

BI-STABLE CHIRAL SPLAY NEMATIC MODE LIQUID CRYSTAL DISPLAY DEVICE AND METHOD OF DRIVING THE SAME

This application claims the benefit of Korea Patent Application No. 10-2010-0041328, filed on May 3, 2010, the entire contents of which is incorporated herein by reference for all purposes as if fully set forth herein.

BACKGROUND

1. Field of the Invention

The present disclosure relates to a liquid crystal display device, and more particularly, to a bi-stable chiral splay nematic mode liquid crystal display device and a method of driving the bi-stable chiral splay nematic mode liquid crystal display device.

2. Discussion of the Related Art

As the information age progresses, display devices processing and displaying a large amount of information have been rapidly developed. Recently, flat panel display (FPD) devices such as a liquid crystal display (LCD) device, a plasma display panel (PDP) device and an organic light emitting diode (OLED) device have been suggested. Among the various FPD devices, the LCD device has been widely used for its superiorities of small size, light-weight, thin profile and low power consumption.

In general, a twisted nematic (TN) mode LCD device using a nematic liquid crystal is widely used. In the TN mode LCD device, a pixel electrode is formed in each pixel region on an array substrate as a lower substrate and a common electrode is formed on a color filter substrate as an upper substrate. A data voltage and a common voltage are applied to the pixel electrode and the common electrode, respectively, to generate a vertical electric field between the pixel electrode and the common electrode and liquid crystal molecules in a liquid crystal layer between the pixel electrode and the common electrode are re-aligned according to the vertical electric field. As a result, a transmittance of the liquid crystal layer is changed and images are displayed.

The TN mode LCD device displays images by re-aligning the liquid crystal molecules according to the electric field generated by a voltage difference between the pixel electrode and the common electrode. When the vertical electric field is not generated, the TN mode liquid crystal molecules return to an initial orientation state. Accordingly, the voltages are kept to be applied to the pixel electrode and the common electrode for the TN mode LCD device to display images.

Recently, an E-book or an E-paper, where a fixed image such as a text is displayed for a relatively long time period without changes, has been the subject of research and development. When the TN mode LCD device is applied to the E-book or the E-paper, a relatively high power is unnecessarily consumed for displaying a fixed image for a relatively long time period as for displaying a moving image. As a result, an LCD device applicable to an E-book or an E-paper with a lower power consumption has been required.

BRIEF SUMMARY

A method of driving a bi-stable chiral splay nematic mode liquid crystal display device including first and second substrates, a liquid crystal layer between the first and second substrates, first and second reset electrodes on one of inner surfaces of the first and second substrates, a pixel electrode on the inner surface of the first substrate and a common electrode on the inner surface of the second substrate includes: applying a data voltage and a common voltage to the pixel electrode and the common electrode, respectively, such that a vertical electric field is generated and the liquid crystal layer transitions from a splay state to a π-twist state during a writing period; and floating the pixel electrode and the common electrode such that the liquid crystal layer keeps the π-twist state and displays a present image during a memory period.

In another aspect, a bi-stable chiral splay nematic mode liquid crystal display device includes: first and second substrates facing and spaced apart from each other, the first and second substrates including a pixel region; a liquid crystal layer between the first and second substrates, the liquid crystal layer including bi-stable chiral splay nematic liquid crystal molecules; first and second reset electrodes on one of inner surfaces of the first and second substrates, the first and second reset electrodes spaced apart from each other; a pixel electrode in the pixel region on the inner surface of the first substrate; and a common electrode on the inner surface of the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings. Wherever possible, similar reference numbers will be used to refer to the same or similar parts.

Figure 1:
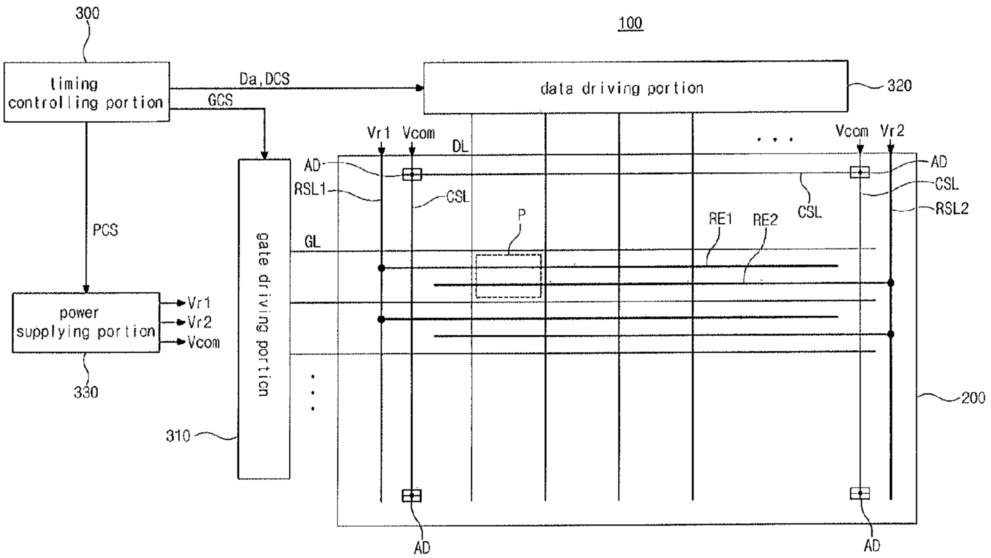
FIG. 1 is a view showing a bi-stable chiral splay nematic mode liquid crystal display device according to an embodiment of the present invention.
Figure 2:
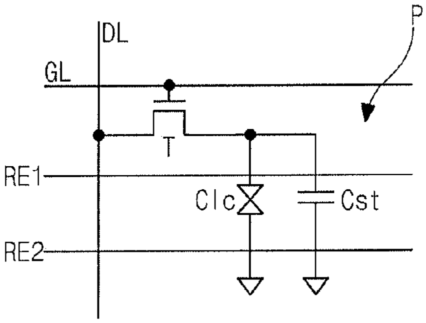
FIG. 2 is a view showing an equivalent circuit to a single pixel region of a bi-stable chiral splay nematic mode liquid crystal display device according to an embodiment of the present invention

FIG. 1 is a view showing a bi-stable chiral splay nematic mode liquid crystal display device according to an embodiment of the present invention, and FIG. 2 is a view showing an equivalent circuit to a single pixel region of a bi-stable chiral splay nematic mode liquid crystal display device according to an embodiment of the present invention.

In FIG. 1, a bi-stable chiral splay nematic (BCSN) mode liquid crystal display (LCD) device 100 includes a liquid crystal panel 200 and a driving circuit unit including a timing controlling portion 300, a gate driving portion 310, a data driving portion 320 and a power supplying portion 330. The driving circuit unit generates various signals and supplies the various signals to the liquid crystal panel 200.

Although not shown in FIG. 1, when the BCSN mode LCD device 100 has a transmissive type or a transflective type, the BCSN mode LCD device 100 may further include a backlight unit. In addition, when the BCSN mode LCD device 100 has a reflective type, a backlight unit is not required for the BCSN mode LCD device 100.

The liquid crystal panel 200 displaying images includes a plurality of pixel regions P in matrix along horizontal and vertical directions. In the liquid crystal panel 200, a plurality of gate lines GL are formed along the horizontal direction and a plurality of data lines DL are formed along the vertical direction. In addition, a plurality of first reset electrodes RE1 and a plurality of second reset electrodes RE2 are formed along the horizontal direction. The plurality of first reset electrodes RE1 and the plurality of second reset electrodes RE2 are spaced apart from the plurality of gate lines GL and each of the plurality of first reset electrodes RE1 and the plurality of second reset electrodes RE2 may be disposed between two adjacent gate lines GL.

In FIG. 2, a thin film transistor (TFT) T connected to the corresponding gate line GL and the corresponding data line DL and a liquid crystal capacitor Clc connected to the TFT T are formed in each pixel region P. The liquid crystal capacitor Clc includes a pixel electrode PE connected to the TFT T, a common electrode CE facing and spaced apart from the pixel electrode PE and a liquid crystal layer 250 (of FIG. 3) between the pixel electrode PE and the common electrode CE.

A data voltage corresponding to a grey level of an image is applied to the pixel electrode PE and a common voltage Vcom (of FIG. 1) is applied to the common electrode CE. A vertical electric field is generated between the pixel electrode PE and the common electrode CE according to a difference of the data voltage and the common voltage and the liquid crystal layer 250 is driven by the vertical electric field, thereby the image displayed.

The first reset electrode RE1 and the second reset electrode RE2 are not electrically connected to the TFT T and the liquid crystal capacitor Clc in the corresponding pixel region P. First and second reset voltages Vr1 and Vr2 (of FIG. 1) are applied to the first and second reset electrodes RE1 and RE2, respectively. A horizontal electric field is generated between the first and second reset electrodes RE1 and RE2 according to a difference of the first and second reset voltages Vr1 and Vr2 and the liquid crystal layer 250 is reset by the horizontal electric field.

Further, a storage capacitor Cst may be formed in each pixel region P. The storage capacitor Cst keeps the data voltage applied to the pixel electrode PE for a frame. One electrode of the storage capacitor Cst may be connected to the pixel electrode PE and the other electrode of the storage capacitor Cst may be connected to a common line (not shown). The common line may be formed to be parallel to the gate line GL and the first and second reset electrodes RE1 and RE2.

A change in states of the liquid crystal layer of the BCSN mode LCD device due to the vertical electric field and the horizontal electric field will be illustrated hereinafter.

Figure 3:
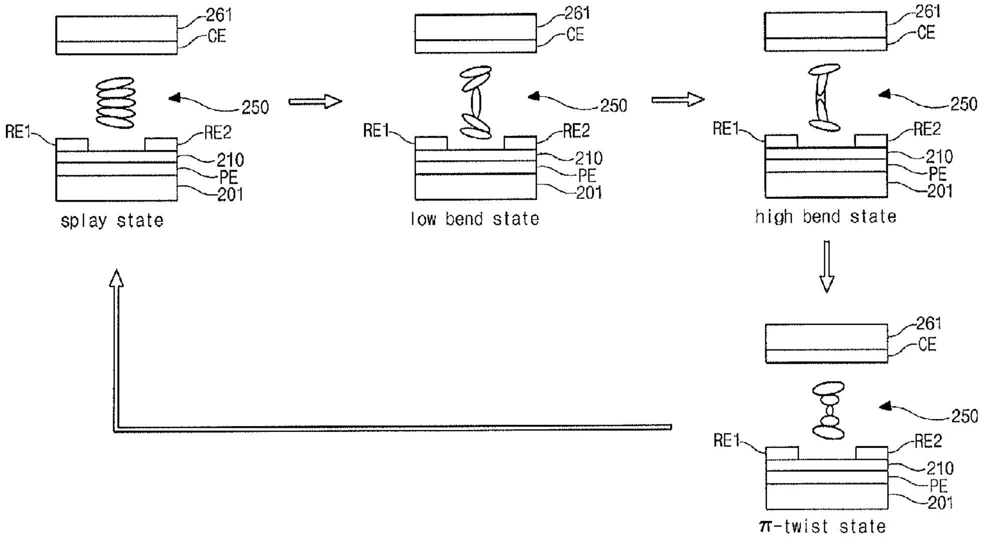
FIG. 3 is a view showing states of a liquid crystal layer of a bi-stable chiral splay nematic mode liquid crystal display device according to an embodiment of the present invention.

FIG. 3 is a view showing states of a liquid crystal layer of a bi-stable chiral splay nematic mode liquid crystal display device according to an embodiment of the present invention.

A liquid crystal layer of a bi-stable chiral splay nematic (BCSN) mode liquid crystal display device includes BCSN liquid crystal molecules having a bi-stable property. For example, the BCSN liquid crystal molecules may be formed by adding a chiral dopant to nematic liquid crystal molecules.

The BCSN liquid crystal molecules have two stable states, i.e., bi-stable states. For example, the BCSN liquid crystal molecules are stabilized in both a splay state and a π-twist state. Accordingly, when the BCSN liquid crystal molecules have one of the splay state and the π-twist state, the BCSN liquid crystal molecules keep the alignment without an additional applied voltage. The bi-stable states may be obtained by applying a vertical electric field or a horizontal electric field to the BCSN liquid crystal molecules.

In FIG. 3, a liquid crystal panel 200 (of FIG. 1) includes first and second substrates 201 and 261 facing and spaced apart from each other and a liquid crystal layer 250 between the first and second substrates 201 and 261. The liquid crystal layer 250 includes BCSN liquid crystal molecules.

A pixel electrode PE is formed on an inner surface of the first substrate 201 and a common electrode CE is formed on an inner surface of the second substrate 261. In addition, first and second reset electrodes RE1 and RE2 are formed on one of the inner surfaces of the first and second substrates 201 and 261. When the first and second reset electrodes RE1 and RE2 are formed on the inner surface of the first substrate 201, an insulating layer 210 may be formed between the first and second reset electrodes RE1 and RE2 and the pixel electrode PE. For example, the first and second reset electrodes RE1 and RE2 may be formed on the pixel electrode PE or may be formed under the pixel electrode PE. Further, a plurality of first reset electrodes RE1 and a plurality of second reset electrodes RE2 may be disposed in the pixel region P such that the plurality of first reset electrodes RE1 alternate with and are parallel to the plurality of second reset electrodes RE2. The first reset electrode RE1 and the second reset electrode RE2 may be spaced apart from each other by a spacing distance. For example, the spacing distance may be within a range of about 3 μm to about 100 μm.

The pixel electrode PE may be formed in the substantially whole pixel region P. The pixel electrode PE may include a transparent conductive material such as indium-tin-oxide (ITO), indium-zinc-oxide (IZO) and indium-tin-zinc-oxide (ITZO). In addition, the first and second reset electrodes RE1 and RE2 may include a transparent conductive material as mentioned above or an opaque conductive material.

The common electrode CE may be formed on the substantially whole inner surface of the second substrate 261. As a result, an equal common voltage may be applied to all the pixel regions P. In addition, the common electrode may include a transparent conductive material as mentioned above.

A gate line GL (of FIG. 2), a data line DL (of FIG. 2) and a thin film transistor (TFT) T (of FIG. 2) may be formed on the inner surface of the first substrate 201. Although not shown in FIG. 3, first and second orientation layers may be formed on the inner surfaces of the first and second substrates 201 and 206, respectively, for an initial orientation of the BCSN liquid crystal molecules. The BCSN liquid crystal molecules may have an initial orientation of a splay state. Further, first and second polarizing plates may be formed on outer surfaces of the first and second substrates 201 and 206, respectively.

When no voltage is applied to the pixel electrode PE, the common electrode CE and first and second reset electrodes RE1 and RE2, the BCSN liquid crystal molecules of the liquid crystal layer 250 have a splay state which is one of the bi-stable states. In the splay state, the BCSN liquid crystal molecules have a twist angle of about 0° and a predetermined tilt angle.

When a data voltage is applied to the pixel electrode PE and a common voltage Vcom (of FIG. 1) is applied to the common electrode CE, a vertical electric field is generated between the pixel electrode PE and the common electrode CE due to a difference of the data voltage and the common voltage Vcom. The vertical electric field is applied to the BCSN liquid crystal molecules so that the BCSN liquid crystal molecules can transition from the splay state to a bend state. In detail, the BCSN liquid crystal molecules may transition from the splay state to a high bend state through a low bend state according to the difference of the data voltage and the common voltage Vcom. As the BCSN liquid crystal molecules transition to the high bend state, most of the BCSN liquid crystal molecules rise along the vertical electric field such that directors of the BCSN liquid crystal molecules are re-aligned along the direction of the vertical electric field. Here, the liquid crystal layer 250 including the BCSN liquid crystal molecules partially transitions to the high bend state according to a magnitude of the difference of the data voltage and the common voltage Vcom and an applied time of the data voltage and the common voltage Vcom. For example, an area of a portion of the liquid crystal layer 250 having the high bend state may be proportional to the magnitude and the applied time of the data voltage.

Next, when the data voltage and the common voltage applied to the pixel electrode PE and the common electrode CE, respectively, are removed such that the pixel electrode PE and the common electrode CE are electrically floating, the vertical electric field is removed and the BCSN liquid molecules transition from the bend state to a π-twist state which is the other of the bi-stable states. As the BCSN liquid crystal molecules transition to the π-twist state, the BCSN liquid crystal molecules twist by about 180° along a thickness direction of the liquid crystal layer 250 and the directors of the BCSN liquid crystal molecules lie to be parallel to the inner surfaces of the first and second substrates 201 and 261. In the π-twist state, the BCSN liquid crystal molecules have a twist angle of about 180° and a predetermined tilt angle.

Since the π-twist state is one of the bi-stable states, the BCSN liquid crystal molecules do not transition to the splay state as an initial state and keep the π-twist state when no voltage is applied to the pixel electrode PE and the common electrode CE, i.e., even when the vertical electric field is removed.

For the transition from the splay state to the π-twist state through the bend state, it is required that the difference between the data voltage of the pixel electrode PE and the common voltage Vcom of the common electrode CE is equal to or greater than a reference voltage, for example, a threshold voltage. When the difference between the data voltage and the common voltage Vcom is smaller than the threshold voltage, the BCSN liquid crystal molecules do not transition from the bend state to the π-twist state even after the data voltage applied to the pixel electrode PE and the common voltage applied to the common electrode CE are removed. Instead, the BCSN liquid crystal molecules transition from the bend state to the splay state again.

Next, when first and second reset voltages Vr1 and Vr2 (of FIG. 1) are applied to the first and second reset electrodes RE1 and RE2, respectively, a horizontal electric field is generated between the first and second reset electrodes RE1 and RE2 due to a difference of the first and second reset voltages Vr1 and Vr2. The horizontal electric field is applied to the BCSN liquid crystal molecules so that the BCSN liquid crystal molecules can transition from the π-twist state to the splay state. Here, the first and second reset voltages Vr1 and Vr2 are different from each other to generate the horizontal electric field. For example, one of the first and second reset voltages Vr1 and Vr2 may be a relatively high level voltage and the other of the first and second reset voltages Vr1 and Vr2 may be a relatively low level voltage.

Accordingly, the BCSN liquid crystal molecules have a bi-stable property such that the BCSN liquid crystal molecules transition from the splay state to the π-twist state due to generation and removal of the vertical electric field and transition from the π-twist state to the splay state due to generation of the horizontal electric field. Since the twist angle of the splay state is different from the twist angle of the π-twist state, transmittances of the liquid crystal layer 250 in the bi-stable states are different from each other and the transmittance difference is used for an image display.

In the BCSN mode LCD device including the BCSN liquid crystal molecules, power consumption is reduced. When the data voltage and the common voltage are applied to and removed from the pixel electrode PE and the common electrode CE, respectively, the BCSN liquid crystal molecules have the π-twist state, i.e., one of the bi-stable states and the π-twist state of the BCSN liquid crystal molecules are kept till the horizontal electric field is generated.

For example, when "0" and "1" as image information represent the splay state and the π-twist state, respectively, the pixel region where the data voltage corresponding to "0" is applied and then is removed may have the splay state and the splay state of the pixel region may be kept till the other voltages are applied. In addition, the pixel region where the data voltage corresponding to "1" is applied and then is removed may have the π-twist state and the π-twist state of the pixel region may be kept till the other voltages are applied. Since both the splay state and the π-twist state are a stable state, the splay state and the π-twist state of the pixel region are kept even when the power is removed.

Since the BCSN liquid crystal molecules have a function remembering the applied data voltage as a memory element, the present images of the bi-stable states are kept being displayed till the next images are displayed. Accordingly, the BCSN mode LCD device displays the fixed images for a long time without additional power consumption. For the purpose of displaying the next images, after the alignment state of the BCSN liquid crystal molecules is restored to the splay state as an initial state by generating the horizontal electric field, the data voltages corresponding to the next images may be applied to the pixel electrode PE.

In addition, a ratio d/p of a cell gap d of the liquid crystal layer 250 including the BCSN liquid crystal molecules to a pitch p of the BCSN liquid crystal molecules may be about 0.25. For example, the required ratio d/p of the cell gap d to the pitch p may be obtained by controlling an amount of a chiral dopant added to the BCSN liquid crystal molecules of the liquid crystal layer 250 having a predetermined cell gap.

Figure 4:
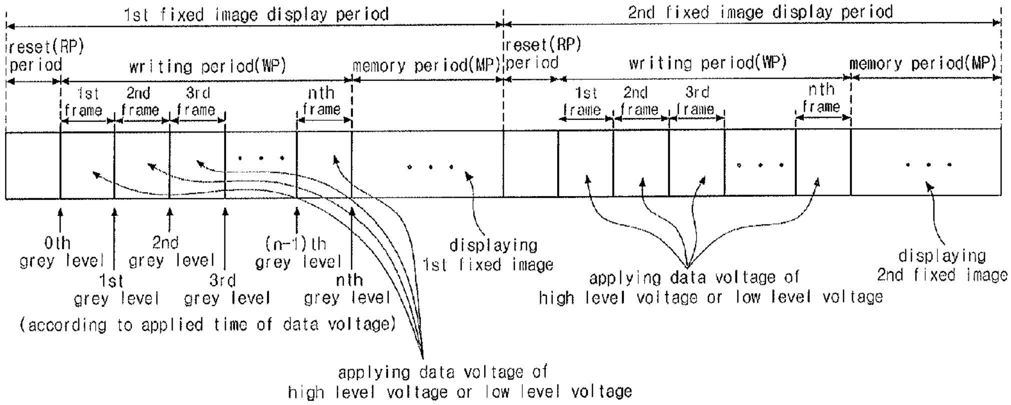
FIG. 4 is a view illustrating a method of driving a bi-stable chiral splay nematic mode liquid crystal display device according to a first embodiment of the present invention.

FIG. 4 is a view illustrating a method of driving a bi-stable chiral splay nematic mode liquid crystal display device according to a first embodiment of the present invention. FIG. 4 shows a data voltage applied to a single pixel region of a bi-stable chiral splay nematic mode liquid crystal display device by a display period.

In FIG. 4, when a bi-stable chiral splay nematic (BCSN) mode liquid crystal display (LCD) device displays a fixed image such as a text for a relatively long time, each of first and second fixed image display period includes a reset period RP, a writing period WP and a memory period MP. The BCSN mode LCD device may display grey levels of the fixed image according to the number of the frames where a data voltage of high level is applied to a pixel electrode PE (of FIG. 3) during the writing period WP.

During the reset period RP, the pixel electrode PE and a common electrode CE (of FIG. 3) are floating, and first and second reset voltages Vr1 and Vr2 (of FIG. 1) are applied to first and second reset electrodes RE1 and RE2 (of FIG. 3), respectively. As a result, a horizontal electric field is generated between the first and second reset electrodes RE1 and RE2, and a liquid crystal layer 250 (of FIG. 3) has a splay state due to the horizontal electric field to display a zeroth grey level (for example, black). The reset period RP may be kept during a predetermined number of the frames to obtain the splay state stably.

During the writing period WP, the data voltage and a common voltage Vcom (of FIG. 1) are applied to the pixel electrode PE and the common electrode CE, respectively, and the first and second reset electrodes RE1 and RE2 are floating. As a result, a vertical electric field is generated between the pixel electrode PE and the common electrode CE, and the liquid crystal layer 250 has a high bend state through a low bend state due to the vertical electric field to display first to nth grey levels.

The liquid crystal layer 250 in a single pixel region P (of FIG. 1) partially transitions to the high bend state, and an area of a portion of the liquid crystal layer 250 having the high bend state is proportional to a magnitude and an applied time of the data voltage. The writing period WP includes first to nth frames. For the purpose of displaying the grey levels, the data voltage of high level or low level is applied to the pixel electrode PE during each of the first to nth frames, and the common voltage Vcom is consistently applied to the common electrode CE during the whole of the first to nth frames.

When the data voltage of the high level is applied to the pixel electrode PE, the vertical electric field is generated between the pixel electrode PE and the common electrode CE and the liquid crystal layer 250 has the high bend state due to the vertical electric field to display the image information of "1." When the data voltage of the low level is applied to the pixel electrode PE, no electric field is generated between the pixel electrode PE and the common electrode CE and the liquid crystal layer 250 has the splay state to display the image information "0."

For example, for the purpose of displaying the first grey level, the data voltage of the high level corresponding to the image information "1" may be applied to the pixel electrode PE during the first frame, and the data voltage of the low level corresponding to the image information "0" may be applied to the pixel electrode PE during the second to nth frames. In addition, for the purpose of displaying the second grey level, the data voltage of the high level corresponding to the image information "1" may be applied to the pixel electrode PE during the first and second frames, and the data voltage of the low level corresponding to the image information "0" may be applied to the pixel electrode PE during the third to nth frames. Further, for the purpose of displaying the nth grey level, the data voltage of the high level corresponding to the image information "1" may be applied to the pixel electrode PE during the whole of the first to nth frames.

As a result, for the purpose of displaying the zeroth to nth grey levels (total (n+1) grey levels), the BCSN mode LCD device is driven such that the first to nth grey levels may correspond to the first to nth frames by one-to-one correspondence and the number of the frames (0~n) of the writing period WP where the data voltage of high level is applied may increase according to the grey level to be displayed. For example, when the BCSN mode LCD device displays zeroth to fifteenth grey levels (total 16 grey levels), the writing period WP may include 15 frames of first to fifteenth frames, and the number of the frames (0~15) where the data voltage of high level is applied may be determined by the grey level to be displayed.

Since the area of the portion of the liquid crystal layer 250 in the single pixel region P having the high bend state increases proportional to the applied time (the number of frames) of the data voltage of high level, the area of the portion having the high bend state is proportional to the grey level to be displayed. In addition, when the data voltage and the common voltage Vcom are removed, the portion having the high bend state transitions to a π-twist state to be stabilized. Therefore, the area of the portion of the liquid crystal layer 250 in the single pixel region P having the π-twist state is proportional to the grey level to be displayed. In addition, to prevent deterioration of the liquid crystal layer 250, the BCSN mode LCD device may be driven by a frame inversion method such that the data voltage applied to the pixel electrode PE has inverse polarities by frames.

Further, during the memory period MP, the pixel electrode PE and the common electrode CE are floating by removing the data voltage and the common voltage Vcom from the pixel electrode PE and the common electrode CE, and the vertical electric field is removed. Since the π-twist state is one of the bi-stable states, the liquid crystal layer 250 keeps the π-twist state till an electric field is applied from exterior. Accordingly, the liquid crystal layer 250 has a memory property such that the grey level corresponding to the data voltage of the writing period WP is displayed during the memory period MP. The first and second reset electrodes RE1 and RE2 are floating during the memory period MP, and the memory period MP is kept during a plurality of frames till the next fixed image is displayed.

After the first fixed image display period for displaying the first fixed image is closed according to a user's choice or a program, a second fixed image is displayed during the second fixed image display period. Similarly to the first fixed image display period, the liquid crystal layer 250 transitions from the π-twist state by the data voltage corresponding to the first fixed image to the splay state due to the first and second reset voltages Vr1 and Vr2 during the reset period RP. In addition, after the liquid crystal layer 250 transitions to the high bend state due to the data voltage corresponding to the second fixed image during the writing period WP, the liquid crystal layer 250 keeps displaying the second fixed image during the memory period MP.

In the BCSN mode LCD device according to the first embodiment of the present invention, the writing period WP includes the plurality of frames whose number (n) is less than the number (n+1) of the whole grey levels by 1, and the number of frames where the data voltage of high level is applied increases according to the grey level displayed by the pixel region P. As a result, the BCSN mode LCD device displays the grey levels and displays the fixed images during the memory period MP without an additional supply of power.

Although the number (n) of the frames of the writing period WP is less than the number (n+1) of the whole grey levels by 1 in the BCSN mode LCD device according to the first embodiment, the number of the frames of the writing period WP may be more than the number of the whole grey levels in the BCSN mode LCD device according to another embodiment.

Figure 5:
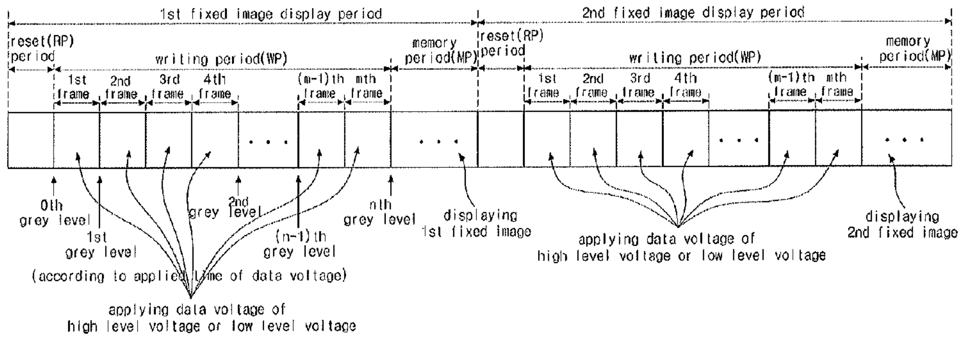
FIG. 5 is a view illustrating a method of driving a bi-stable chiral splay nematic mode liquid crystal display device according to a second embodiment of the present invention.

FIG. 5 is a view illustrating a method of driving a bi-stable chiral splay nematic mode liquid crystal display device according to a second embodiment of the present invention. FIG. 5 shows a data voltage applied to a single pixel region of a bi-stable chiral splay nematic mode liquid crystal display device by a display period.

In FIG. 5, when a bi-stable chiral splay nematic (BCSN) mode liquid crystal display (LCD) device displays a fixed image such as a text for a relatively long time, each of first and second fixed image display period includes a reset period RP, a writing period WP and a memory period MP. The BCSN mode LCD device may display grey levels of the fixed image according to the number of the frames where a data voltage of high level is applied to a pixel electrode PE (of FIG. 3) during the writing period WP.

During the reset period RP, the pixel electrode PE and a common electrode CE (of FIG. 3) are floating, and first and second reset voltages Vr1 and Vr2 (of FIG. 1) are applied to first and second reset electrodes RE1 and RE2 (of FIG. 3), respectively. As a result, a horizontal electric field is generated between the first and second reset electrodes RE1 and RE2, and a liquid crystal layer 250 (of FIG. 3) has a splay state due to the horizontal electric field to display a zeroth grey level (for example, black). The reset period RP may be kept during a predetermined number of the frames to obtain the splay state stably.

During the writing period WP, the data voltage and a common voltage Vcom (of FIG. 1) are applied to the pixel electrode PE and the common electrode CE, respectively, and the first and second reset electrodes RE1 and RE2 are floating. As a result, a vertical electric field is generated between the pixel electrode PE and the common electrode CE, and the liquid crystal layer 250 has a high bend state through a low bend state due to the vertical electric field to display first to nth grey levels.

The liquid crystal layer 250 in a single pixel region P (of FIG. 1) partially transitions to the high bend state, and an area of a portion of the liquid crystal layer 250 having the high bend state is proportional to a magnitude and an applied time of the data voltage. The writing period WP includes first to mth frames. For the purpose of displaying the grey levels, the data voltage of high level or low level is applied to the pixel electrode PE during each of the first to mth frames, and the common voltage Vcom is consistently applied to the common electrode CE during the whole of the first to mth frames.

When the data voltage of the high level is applied to the pixel electrode PE, the vertical electric field is generated between the pixel electrode PE and the common electrode CE and the liquid crystal layer 250 has the high bend state due to the vertical electric field to display the image information of "1." When the data voltage of the low level is applied to the pixel electrode PE, no electric field is generated between the pixel electrode PE and the common electrode CE and the liquid crystal layer 250 has the splay state to display the image information "0."

For example, for the purpose of displaying the first grey level, the data voltage of the high level corresponding to the image information "1" may be applied to the pixel electrode PE during the first frame, and the data voltage of the low level corresponding to the image information "0" may be applied to the pixel electrode PE during the second to mth frames. In addition, for the purpose of displaying the second grey level, the data voltage of the high level corresponding to the image information "1" may be applied to the pixel electrode PE during the first to fourth frames, and the data voltage of the low level corresponding to the image information "0" may be applied to the pixel electrode PE during the fifth to mth frames. Further, for the purpose of displaying the nth grey level, the data voltage of the high level corresponding to the image information "1" may be applied to the pixel electrode PE during the whole of the first to mth frames.

As a result, for the purpose of displaying the zeroth to nth grey levels (total (n+1) grey levels), the BCSN mode LCD device is driven such that the first to nth grey levels may correspond to the first to mth frames by one-to-p correspondence (p is a natural number equal to or greater than 1) and the number of the frames (0~m) of the writing period WP where the data voltage of high level is applied may increase proportional to the grey level to be displayed.

Here, the number of additional frames corresponding to each of the grey levels may be determined as a natural number equal to or greater than 1. FIG. 5 exemplarily shows that the number of the additional frame (the first frame) corresponding to the first grey level is 1, the number of the additional frames (the second to fourth frames) corresponding to the second grey level is 3, and the number of the additional frames (the (m−1)th frame and mth frame) corresponding to the nth grey level is 2.

For example, when the BCSN mode LCD device displays zeroth to fifteenth grey levels (total 16 grey levels), the writing period WP may include 41 frames of first to forty-first frames. The first grey level may correspond to the first frame, and the second to thirteenth grey levels may correspond to the second to thirty-seventh frames such that each of the second to thirteenth grey levels correspond to 3 frames. In addition, the fourteenth and fifteenth grey levels may correspond to the thirty-eighth to forty-first frames such that each of the fourteenth and fifteenth grey levels correspond to 2 frames. As a result, the number of the additional frames where the data voltage of high level is applied may be determined by the grey level to be displayed. In the second embodiment, since the number of the additional frames corresponding to each grey level can be determined differently, the two adjacent grey levels may have various brightness differences and the emphasized grey level may be determined according to a kind of the fixed image.

Since the area of the portion of the liquid crystal layer 250 in the single pixel region P having the high bend state increases proportional to the applied time (the number of frames) of the data voltage of high level, the area of the portion having the high bend state is proportional to the grey level to be displayed. In addition, when the data voltage and the common voltage Vcom are removed, the portion having the high bend state transitions to a π-twist state to be stabilized. Therefore, the area of the portion of the liquid crystal layer 250 in the single pixel region P having the π-twist state is proportional to the grey level to be displayed. In addition, to prevent deterioration of the liquid crystal layer 250, the BCSN mode LCD device may be driven by a frame inversion method such that the data voltage applied to the pixel electrode PE has inverse polarities by frames.

Further, during the memory period MP, the pixel electrode PE and the common electrode CE are floating by removing the data voltage and the common voltage Vcom from the pixel electrode PE and the common electrode CE, and the vertical electric field is removed. Since the π-twist state is one of the bi-stable states, the liquid crystal layer 250 keeps the π-twist state till an electric field is applied from exterior. Accordingly, the liquid crystal layer 250 has a memory property such that the grey level corresponding to the data voltage of the writing period WP is displayed during the memory period MP. The first and second reset electrodes RE1 and RE2 are floating during the memory period MP, and the memory period MP is kept during a plurality of frames till the next fixed image is displayed.

After the first fixed image display period for displaying the first fixed image is closed according to a user's choice or a program, a second fixed image is displayed during the second fixed image display period. Similarly to the first fixed image display period, the liquid crystal layer 250 transitions from the π-twist state by the data voltage corresponding to the first fixed image to the splay state due to the first and second reset voltages Vr1 and Vr2 during the reset period RP. In addition, after the liquid crystal layer 250 transitions to the high bend state due to the data voltage corresponding to the second fixed image during the writing period WP, the liquid crystal layer 250 keeps displaying the second fixed image during the memory period MP.

In the BCSN mode LCD device according to the second embodiment of the present invention, the writing period WP includes the plurality of frames whose number (m) is equal to or more than the number (n+1) of the whole grey levels ((n+1)≤m), and the number of frames where the data voltage of high level is applied increases according to the grey level displayed by the pixel region P. As a result, the BCSN mode LCD device displays the grey levels and displays the fixed images during the memory period MP without an additional supply of power. Moreover, the BCSN mode LCD device displays the fixed image with various brightness differences between two adjacent grey levels according to a kind of the fixed image.

Although the number (m) of the frames of the writing period WP is less than the number (n+1) of the whole grey levels by 1 (n=m) or the number (m) of the frames of the writing period WP is equal to or more than the number (n+1) of the whole grey levels ((n+1)≤m) in the BCSN mode LCD device according to the first or second embodiment, the writing period WP may include a single frame and the magnitude of the data voltage applied to the pixel electrode may vary according to the grey levels in the BCSN mode LCD device according to another embodiment.

Figure 6:
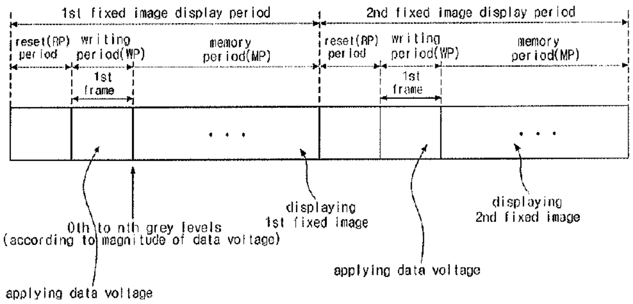
FIG. 6 is a view illustrating a method of driving a bi-stable chiral splay nematic mode liquid crystal display device according to a third embodiment of the present invention.

FIG. 6 is a view illustrating a method of driving a bi-stable chiral splay nematic mode liquid crystal display device according to a third embodiment of the present invention. FIG. 6 shows a data voltage applied to a single pixel region of a bi-stable chiral splay nematic mode liquid crystal display device by a display period.

In FIG. 6, when a bi-stable chiral splay nematic (BCSN) mode liquid crystal display (LCD) device displays a fixed image such as a text for a relatively long time, each of first and second fixed image display period includes a reset period RP, a writing period WP and a memory period MP. The BCSN mode LCD device may display grey levels of the fixed image according to a magnitude of a data voltage of high level applied to a pixel electrode PE (of FIG. 3) during the writing period WP.

During the reset period RP, the pixel electrode PE and a common electrode CE (of FIG. 3) are floating, and first and second reset voltages Vr1 and Vr2 (of FIG. 1) are applied to first and second reset electrodes RE1 and RE2 (of FIG. 3), respectively. As a result, a horizontal electric field is generated between the first and second reset electrodes RE1 and RE2, and a liquid crystal layer 250 (of FIG. 3) has a splay state due to the horizontal electric field to display a zeroth grey level (for example, black). The reset period RP may be kept during a predetermined number of the frames to obtain the splay state stably.

During the writing period WP, the data voltage and a common voltage Vcom (of FIG. 1) are applied to the pixel electrode PE and the common electrode CE, respectively, and the first and second reset electrodes RE1 and RE2 are floating. As a result, a vertical electric field is generated between the pixel electrode PE and the common electrode CE, and the liquid crystal layer 250 has a high bend state through a low bend state due to the vertical electric field to display first to nth grey levels.

The liquid crystal layer 250 in a single pixel region P (of FIG. 1) partially transitions to the high bend state, and an area of a portion of the liquid crystal layer 250 having the high bend state is proportional to a magnitude and an applied time of the data voltage. The writing period WP includes a first frame as a single frame. For the purpose of displaying the grey levels, one of zeroth to nth data voltages (V0~Vn) having different magnitudes is applied to the pixel electrode PE, and the common voltage Vcom is applied to the common electrode CE during the first frame. The one of the zeroth to nth data voltages corresponds to the grey level to be displayed. For example, the zeroth to nth data voltages (V0~Vn) may be determined to gradually increase.

When one of the data voltages is applied to the pixel electrode PE, the vertical electric field is generated between the pixel electrode PE and the common electrode CE and the liquid crystal layer 250 has the high bend state due to the vertical electric field. Here, an area of a portion of the liquid crystal layer 250 in the pixel region P having the high bend state is proportional to the magnitude of the one of the data voltages so that the image information can be displayed.

For example, for the purpose of displaying the zeroth grey level, a zeroth data voltage V0 of low level corresponding to the common voltage Vcom may be applied to the pixel electrode PE during the first frame and the whole liquid crystal layer 250 in the pixel region P may have the splay state. For the purpose of displaying the first grey level, a first data voltage V1 greater than the zeroth data voltage V0 (V0<V1) may be applied to the pixel electrode PE during the first frame and a first portion of the liquid crystal layer 250 in the pixel region P may transition to the high bend state. In addition, for the purpose of displaying the second grey level, a second data voltage V2 greater than the first data voltage V1 (V1<V2) may be applied to the pixel electrode PE during the first frame and a second portion, which is greater than the first portion, of the liquid crystal layer 250 in the pixel region P may transition to the high bend state. Similarly, for the purpose of displaying the nth grey level, a nth data voltage Vn greater than a (n−1)th data voltage Vn−1 (Vn−1<Vn) may be applied to the pixel electrode PE during the first frame and a nth portion, which is greater than a (n−1)th portion, of the liquid crystal layer 250 in the pixel region P may transition to the high bend state. The nth portion may be equal to or smaller than the pixel region P.

As a result, for the purpose of displaying the zeroth to nth grey levels (total (n+1) grey levels), the BCSN mode LCD device is driven such that one of the zeroth to nth data voltages V0 to Vn may be applied to the pixel electrode PE during the first frame of the writing period WP and a portion, which corresponds to the one of the zeroth to nth data voltages V0 to Vn, of the liquid crystal layer 250 in the pixel region P may transition to the high bend state.

Here, the differences between adjacent two of the zeroth to nth data voltages V0 to Vn may be determined equal to or different from one another according to the differences between adjacent two of the grey levels. In addition, the emphasized grey level may be determined according to a kind of the fixed image by designing the differences between adjacent two of the zeroth to nth data voltages V0 to Vn different from one another.

For example, when the BCSN mode LCD device displays zeroth to fifteenth grey levels (total 16 grey levels), one of the zeroth to fifteenth data voltages V0 to V15 (total 16 data voltages) may be applied to the pixel electrode PE.

Since the area of the portion of the liquid crystal layer 250 in the single pixel region P having the high bend state increases proportional to the magnitude of the data voltage applied to the pixel electrode PE, the area of the portion having the high bend state is proportional to the grey level to be displayed. In addition, when the data voltage and the common voltage Vcom are removed, the portion having the high bend state transitions to a π-twist state to be stabilized. Therefore, the area of the portion of the liquid crystal layer 250 in the single pixel region P having the π-twist state is proportional to the grey level to be displayed. Moreover, to prevent deterioration of the liquid crystal layer 250, the BCSN mode LCD device may be driven by a frame inversion method such that the data voltage applied to the pixel electrode PE has inverse polarities by frames.

Further, during the memory period MP, the pixel electrode PE and the common electrode CE are floating by removing the data voltage and the common voltage Vcom from the pixel electrode PE and the common electrode CE, and the vertical electric field is removed. Since the π-twist state is one of the bi-stable states, the liquid crystal layer 250 keeps the π-twist state till an electric field is applied from exterior. Accordingly, the liquid crystal layer 250 has a memory property such that the grey level corresponding to the data voltage of the writing period WP is displayed during the memory period MP. The first and second reset electrodes RE1 and RE2 are floating during the memory period MP, and the memory period MP is kept during a plurality of frames till the next fixed image is displayed.

After the first fixed image display period for displaying the first fixed image is closed according to a user's choice or a program, a second fixed image is displayed during the second fixed image display period. Similarly to the first fixed image display period, the liquid crystal layer 250 transitions from the π-twist state by the data voltage corresponding to the first fixed image to the splay state due to the first and second reset voltages Vr1 and Vr2 during the reset period RP. In addition, after the liquid crystal layer 250 transitions to the high bend state due to the data voltage corresponding to the second fixed image during the writing period WP, the liquid crystal layer 250 keeps displaying the second fixed image during the memory period MP.

In the BCSN mode LCD device according to the third embodiment of the present invention, the writing period WP includes the single frame and one of the plurality of data voltages where the number of the plurality of data voltages (e.g., V0~Vn) is the same as the number of the total grey levels (e.g., n+1) is applied to the pixel electrode PE. As a result, the BCSN mode LCD device displays the grey levels and displays the fixed images during the memory period MP without an additional supply of power. Moreover, the BCSN mode LCD device displays the fixed image with various brightness differences between two adjacent grey levels according to a kind of the fixed image by designing the differences between adjacent two of the plurality of data voltages (e.g., V0 to Vn) different from one another.

Although the grey levels are displayed by controlling the applied time or the magnitude of the data voltage applied to the pixel electrode PE in the BCSN mode LCD device according to the first to third embodiments, the various grey levels may be displayed by controlling both the applied time and the magnitude of the data voltage applied to the pixel electrode PE in the BCSN mode LCD device according to another embodiment.

Figure 7:
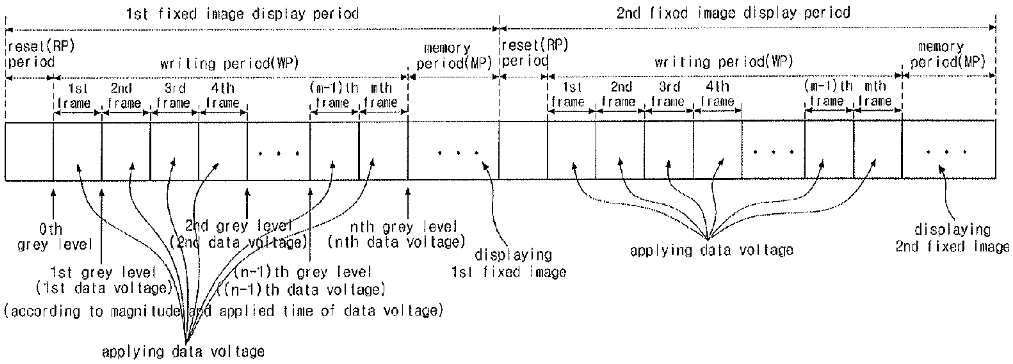
FIG. 7 is a view illustrating a method of driving a bi-stable chiral splay nematic mode liquid crystal display device according to a fourth embodiment of the present invention.

FIG. 7 is a view illustrating a method of driving a bi-stable chiral splay nematic mode liquid crystal display device according to a fourth embodiment of the present invention. FIG. 7 shows a data voltage applied to a single pixel region of a bi-stable chiral splay nematic mode liquid crystal display device by a display period.

In FIG. 7, when a bi-stable chiral splay nematic (BCSN) mode liquid crystal display (LCD) device displays a fixed image such as a text for a relatively long time, each of first and second fixed image display period includes a reset period RP, a writing period WP and a memory period MP. The BCSN mode LCD device may display grey levels of the fixed image according to a magnitude of a data voltage applied to a pixel electrode PE (of FIG. 3) and the number of frames (i.e., an applied time) where the data voltage of high level is applied during the writing period WP.

During the reset period RP, the pixel electrode PE and a common electrode CE (of FIG. 3) are floating, and first and second reset voltages Vr1 and Vr2 (of FIG. 1) are applied to first and second reset electrodes RE1 and RE2 (of FIG. 3), respectively. As a result, a horizontal electric field is generated between the first and second reset electrodes RE1 and RE2, and a liquid crystal layer 250 (of FIG. 3) has a splay state due to the horizontal electric field to display a zeroth grey level (for example, black). The reset period RP may be kept during a predetermined number of the frames to obtain the splay state stably.

During the writing period WP, the data voltage and a common voltage Vcom (of FIG. 1) are applied to the pixel electrode PE and the common electrode CE, respectively, and the first and second reset electrodes RE1 and RE2 are floating. As a result, a vertical electric field is generated between the pixel electrode PE and the common electrode CE, and the liquid crystal layer 250 has a high bend state through a low bend state due to the vertical electric field to display first to nth grey levels.

The liquid crystal layer 250 in a single pixel region P (of FIG. 1) partially transitions to the high bend state, and an area of a portion of the liquid crystal layer 250 having the high bend state is proportional to a magnitude and an applied time of the data voltage. The writing period WP includes first to mth frames. For the purpose of displaying the grey levels, one of zeroth to nth data voltages (V0~Vn) is applied to the pixel electrode PE during each of the first to mth frames, and the common voltage Vcom is consistently applied to the common electrode CE during the whole of the first to mth frames. Since the number of frames where the one of the zeroth to nth data voltages (V0~Vn) are applied is variable, it is not required that the zeroth to nth data voltages (V0~Vn) should be determined to gradually increase.

When one of the data voltages is applied to the pixel electrode PE, the vertical electric field is generated between the pixel electrode PE and the common electrode CE and the liquid crystal layer 250 has the high bend state due to the vertical electric field. Here, an area of a portion of the liquid crystal layer 250 in the pixel region P having the high bend state is proportional to the magnitude of the one of the data voltages and the number of frames where the one of the data voltages is applied (the applied time of the one of the data voltages) so that the image information can be displayed.

For example, for the purpose of displaying the zeroth grey level, a zeroth data voltage V0 of low level corresponding to the common voltage Vcom may be applied to the pixel electrode PE during the first to mth frames and the whole liquid crystal layer 250 in the pixel region P may have the splay state. For the purpose of displaying the first grey level, a first data voltage V1 may be applied to the pixel electrode PE during the first frame and the zeroth data voltage V0 may be applied to the pixel electrode PE during the second to mth frames. In addition, for the purpose of displaying the second grey level, the first data voltage V1 may be applied to the pixel electrode PE during the first frame, a second data voltage V2 may be applied to the pixel electrode PE during the second to fourth frames, and the zeroth data voltage may be applied to the pixel electrode PE during the fifth to mth frames. Similarly, for the purpose of displaying the nth grey level, the first data voltage V1 may be applied to the pixel electrode PE during the first frame, a second data voltage V2 may be applied to the pixel electrode PE during the second to fourth frames, and an nth data voltage Vn may be applied to the pixel electrode PE during the (m−1)th and mth frames. During the fifth to (m−2)th frames, third to (n−1)th data voltages may be applied to the pixel electrode PE. As a result, a portion of the liquid crystal layer 250 proportional to the magnitude and the applied time of the data voltage applied to the pixel electrode PE transitions to the high bend state to display the grey levels.

Accordingly, for the purpose of displaying the zeroth to nth grey levels (total (n+1) grey levels), the BCSN mode LCD device is driven such that the zeroth to nth data voltages V0 to Vn different form each other may be applied to the pixel electrode PE, the first to nth grey levels may correspond to the first to mth frames by one-to-p correspondence (p is a natural number equal to or greater than 1) and the number of the frames (0~m) of the writing period WP where the one of the first to nth data voltages V1 to Vn except for the zeroth data voltage V0 is applied may vary to correspond to the grey level to be displayed.

Here, the number of additional frames corresponding to each of the grey levels may be determined as a natural number equal to or greater than 1. FIG. 7 exemplarily shows that the number of the additional frame (the first frame) corresponding to the first grey level is 1, the number of the additional frames (the second to fourth frames) corresponding to the second grey level is 3, and the number of the additional frames (the (m−1)th frame and mth frame) corresponding to the nth grey level is 2.

For example, when the BCSN mode LCD device displays zeroth to fifteenth grey levels (total 16 grey levels), zeroth to fifteenth data voltages V0 to V15 may be applied to the pixel electrode PE and the writing period WP may include 41 frames of first to forty-first frames. The first grey level may correspond to the first frame, and the second to thirteenth grey levels may correspond to the second to thirty-seventh frames such that each of the second to thirteenth grey levels correspond to 3 frames. In addition, the fourteenth and fifteenth grey levels may correspond to the thirty-eighth to forty-first frames such that each of the fourteenth and fifteenth grey levels correspond to 2 frames. As a result, the number of the additional frames where one of the first to fifteenth data voltages V1 to V15 is applied may be determined by the grey level to be displayed.

Accordingly, the zeroth data voltage V0 or the first data voltage V1 may be applied to the pixel electrode PE during the first frame, and the zeroth data voltage V0 or one of the second to thirteenth data voltages V2 to V13 may be applied to the pixel electrode PE during three of second to thirty-seventh frames (second to fourth frames, fifth to seventh frames, eighth to tenth frames, . . . , thirty-fifth to thirty-seventh frames). Further, the zeroth data voltage V0 or the fourteenth data voltage V14 may be applied to the pixel electrode PE during the thirty-eighth and thirty-ninth frames, and the zeroth data voltage V0 or the fifteenth data voltage V15 may be applied to the pixel electrode during the fortieth and forty-first frames.

Here, the differences between adjacent two of the zeroth to nth data voltages V0 to Vn may be determined equal to or different from one another. In addition, the emphasized grey level may be determined according to a kind of the fixed image.

Since the area of the portion of the liquid crystal layer 250 in the single pixel region P having the high bend state increases proportional to the magnitude and the applied time (the number of frames) of the data voltage applied to the pixel electrode PE, the area of the portion having the high bend state is proportional to the grey level to be displayed. In addition, when the data voltage and the common voltage Vcom are removed, the portion having the high bend state transitions to a π-twist state to be stabilized. Therefore, the area of the portion of the liquid crystal layer 250 in the single pixel region P having the π-twist state is proportional to the grey level to be displayed. Moreover, to prevent deterioration of the liquid crystal layer 250, the BCSN mode LCD device may be driven by a frame inversion method such that the data voltage applied to the pixel electrode PE has inverse polarities by frames.

Further, during the memory period MP, the pixel electrode PE and the common electrode CE are floating by removing the data voltage and the common voltage Vcom from the pixel electrode PE and the common electrode CE, and the vertical electric field is removed. Since the π-twist state is one of the bi-stable states, the liquid crystal layer 250 keeps the π-twist state till an electric field is applied from exterior. Accordingly, the liquid crystal layer 250 has a memory property such that the grey level corresponding to the data voltage of the writing period WP is displayed during the memory period MP. The first and second reset electrodes RE1 and RE2 are floating during the memory period MP, and the memory period MP is kept during a plurality of frames till the next fixed image is displayed.

After the first fixed image display period for displaying the first fixed image is closed according to a user's choice or a program, a second fixed image is displayed during the second fixed image display period. Similarly to the first fixed image display period, the liquid crystal layer 250 transitions from the π-twist state by the data voltage corresponding to the first fixed image to the splay state due to the first and second reset voltages Vr1 and Vr2 during the reset period RP. In addition, after the liquid crystal layer 250 transitions to the high bend state due to the data voltage corresponding to the second fixed image during the writing period WP, the liquid crystal layer 250 keeps displaying the second fixed image during the memory period MP.

In the BCSN mode LCD device according to the fourth embodiment of the present invention, the writing period WP includes the plurality of frames whose number (m) is equal to or more than the number (n+1) of the whole grey levels ((n+1)≤m), and the number of frames where the plurality of data voltages V0 to Vn having the same number as the total grey levels (n+1) is applied corresponds the grey level displayed by the pixel region P. As a result, the BCSN mode LCD device displays the grey levels and displays the fixed images during the memory period MP without an additional supply of power. Moreover, the BCSN mode LCD device displays the fixed image with various brightness differences between two adjacent grey levels according to a kind of the fixed image.

Although the BCSN mode LCD device is illustrated driven with a normally black mode where the liquid crystal layer of the splay state displays a black in the first to fourth embodiments, the BCSN mode LCD device may be driven with a normally white mode where the liquid crystal layer of the splay state displays a white in another embodiment. The driving mode such as a normally black mode and a normally white mode may be changed by controlling polarization axes of first and second polarizing plates on outer surfaces of first and second substrates of the BCSN mode LCD device.

Consequently, in the BCSN mode LCD device, the liquid crystal layer has a π-twist state by applying and removing the data voltage and a fixed image is displayed using a memory property with reduced power consumption. In addition, the grey levels are displayed by controlling at least one of the magnitude and the applied time (the number of frames) of the data voltage. Further, various grey levels is displayed by controlling difference in the magnitude of the data voltages and difference in the applied time (the number of frames) of the data voltages.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of driving a bi-stable chiral splay nematic mode liquid crystal display device including first and second substrates, a liquid crystal layer between the first and second substrates, first and second reset electrodes on one of inner surfaces of the first and second substrates, a pixel electrode on the inner surface of the first substrate and a common electrode on the inner surface of the second substrate, comprising:

applying a data voltage and a common voltage to the pixel electrode and the common electrode, respectively, such that a vertical electric field is generated and the liquid crystal layer transitions from a splay state to a π-twist state during a writing period; and floating the pixel electrode and the common electrode such that the liquid crystal layer keeps the π-twist state and displays a first image having zeroth to nth grey levels during a memory period, wherein the data voltage includes zeroth to nth data voltages gradually increasing, and the writing period includes a first frame, and wherein single one of the zeroth to nth data voltages is applied to the pixel electrode during the first frame such that single one of the zeroth to nth grey levels is displayed according to a one-to-one correspondence with a magnitude of the single one of the zeroth to nth data voltages during the first frame.

2. A method of driving a bi-stable chiral splay nematic mode liquid crystal display device including first and second substrates, a liquid crystal layer between the first and second substrates, first and second reset electrodes on one of inner surfaces of the first and second substrates, a pixel electrode on the inner surface of the first substrate and a common electrode on the inner surface of the second substrate, comprising:

applying a data voltage and a common voltage to the pixel electrode and the common electrode, respectively, such that a vertical electric field is generated and the liquid crystal layer transitions from a splay state to a π-twist state during a writing period; and floating the pixel electrode and the common electrode such that the liquid crystal layer keeps the π-twist state and displays a first image having zeroth to nth grey levels during a memory period, wherein the data voltage includes zeroth to nth data voltages, and the writing period includes first to mth frames, and wherein one of the zeroth to nth data voltages is applied to the pixel electrode during each of the first to mth frames such that single one of the zeroth to nth grey levels is displayed according to a sum of magnitudes and a sum of applied time of the zeroth to nth data voltages during the first to mth frames.

3. The method according to claim 2, wherein the liquid crystal layer transitions to a high bend state through a low bend state due to the vertical electric field, and wherein an area of a portion of the liquid crystal layer having the high bend state is proportional to a magnitude and an applied time of the data voltage.

4. The method according to claim 1, wherein the zeroth to nth grey levels increase proportional to a magnitude of the zeroth to nth data voltages.

5. The method according to claim 2, wherein the zeroth to nth grey levels increase proportional to the sum of the magnitudes and the sum of the applied times of the zeroth to nth data voltages.

6. The method according to claim 2, wherein the first to nth grey levels correspond to the first to mth frames by one-to-p correspondence (p is a natural number equal to or greater than 1).

7. The method of claim 1, wherein the first and second reset electrodes on one of inner surfaces of the first and second substrates are spaced apart from each other by a predetermined distance.

8. The method of claim 1, wherein the first and second reset electrodes are disposed between two adjacent gate lines of the display device and the first reset electrode is parallel to the second reset electrode.

9. The method of claim 2, wherein an insulation layer is disposed between the first and second reset electrodes and the pixel electrode.

10. The method of claim 2, wherein the first and second reset electrodes are parallel to each other with a predetermined distance between the first and second reset electrodes.

* * * * *